Figure 1:
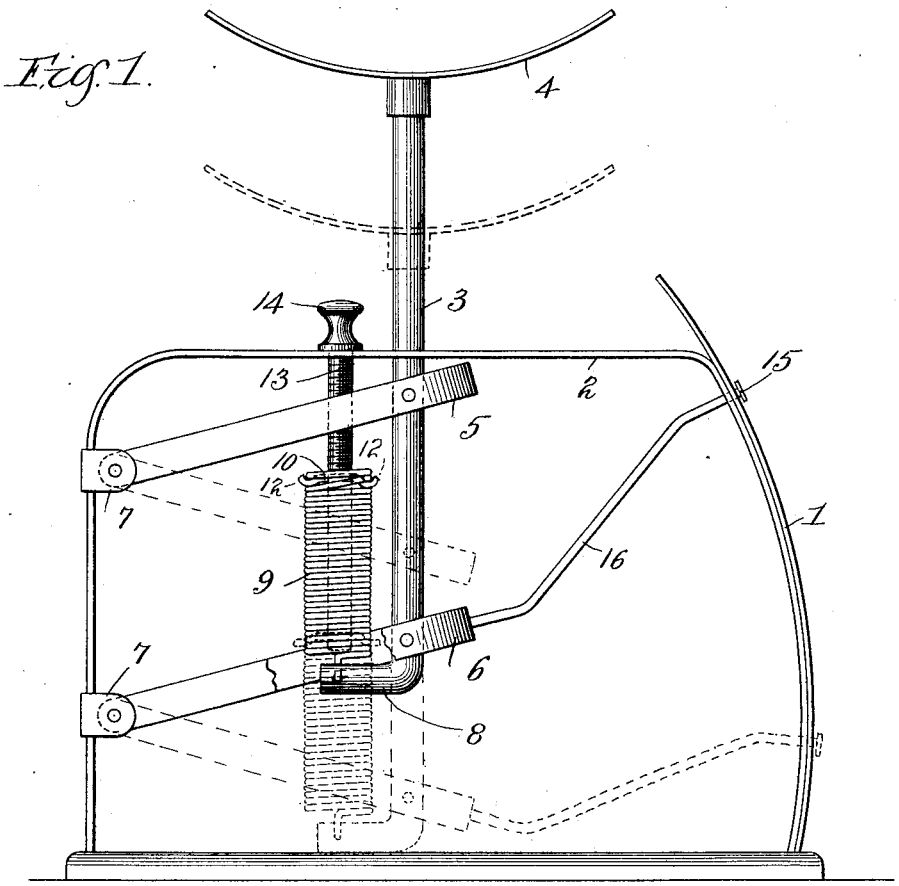

(No Model.)

W. N. PELOUZE.
WEIGHING SCALE.

No. 601,273. Patented Mar. 29, 1898.

Witnesses.
Wm N. Rheem
Wm. J. Hanning

Inventor
Wm N. Pelouze
by Elliott & Hopkins
Att'ys

UNITED STATES PATENT OFFICE.

WILLIAM N. PELOUZE, OF CHICAGO, ILLINOIS.

WEIGHING-SCALE.

SPECIFICATION forming part of Letters Patent No. 601,273, dated March 29, 1898.

Application filed February 3, 1897. Serial No. 621,743. (No model.)

*To all whom it may concern:*

Be it known that I, WILLIAM N. PELOUZE, a citizen of the United States, residing at Chicago, in the county of Cook and State of Illinois, have invented certain new and useful Improvements in Weighing-Scales, of which the following is a full, clear, and exact specification.

My invention relates more particularly to that class of weighing-scales in which the scale-pan or other device for supporting the goods or articles to be weighed is supported by a spring which in turn is suspended from the scale-frame by an adjustable screw, whereby the index or pointer may be raised or lowered at will for setting the scale so that its index will point to zero when the scale is empty.

In the use of scales of this character it is a common practice among grocers and other merchants desiring to weigh out a certain amount of goods directly in the customer's vessel or package to first weigh the vessel or package empty and then turn the adjusting-screw until the index is brought back to zero, whereupon the goods may be poured into the vessel until the index registers the desired weight or amount of goods purchased. By this method it will thus be seen that the merchant is relieved of the necessity of calculating the difference between the weight of the vessel or empty receptacle and the amount of goods purchased. This is not such a desideratum in common scales which indicate the weight only; but where the scale is of that class in which not only the weight but the amount of money or purchase price of the goods sold and weighed is automatically indicated it will be seen that should the scale be of such a construction as to preclude the possibility of resetting the index to zero after the receptacle is placed on the scale the automatically-computing character of the scale would be of but little advantage and, in fact, would be liable to defeat the very object for which it was intended by causing confusion and error. Hence one of the objects of my invention is to provide a spring weighing-scale of the described character with an adjusting-screw of sufficient length to enable the index being reset to zero while subjected to the pressure of a receptacle or other article on the scale-pan without permitting the screw to interfere with the ordinary operation and location of the other parts of the scale.

Another defect of spring-scales of the described class is that the adjusting-screw as heretofore constructed and arranged has been such as to permit of but a slight range of adjustment of the index and also such as to permit the internal parts which it supports to drop down out of reach within the casing inclosing the internal mechanism, thus necessitating that the casing be taken apart and the mechanism reassembled, a task not difficult for a mechanic or one thoroughly familiar with the construction of the device, but one which is beyond the mechanical ability of the ordinary user. Hence a further object of my invention is to so construct and arrange the adjusting-screw with reference to the other parts as to preclude the possibility of the internal mechanism to which the screw is attached becoming detached therefrom.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claim.

Figure 2:
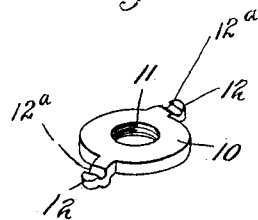

In the said drawings, Figure 1 is a side elevation of a scale embodying my improvements, one of the side plates of the casing being removed for exposing the internal mechanism; and Fig. 2 is an enlarged perspective view of the threaded nut hereinafter described.

In illustrating my invention I have shown it in connection with a scale having a bowed scale plate or dial 1, of the well-known form, which, if desired, may have indicated thereon the weight and amount of the purchase like any of the well-known computing-scales, and which dial is arranged in an upright position at one end of the closed casing 2, in which the operating mechanism is located and from the upper side of which protrudes the stem 3, which supports the scale-pan 4 or other device upon which the goods or article to be weighed may be placed. This stem extends downwardly into the casing 2 and is pivoted to a pair of parallel arms 5 6, each of which is pivoted at one end to a support 7, secured to the side of the casing. These arms are preferably U shape in plan view, and located between them and attached at its lower end to an angular projection 8 on the stem 3 is a coil-spring 9, all as fully shown and described in United States Patent No. 561,309, issued to E. N. Gilfillan June 2, 1896, or any other suitable equivalent construction may be employed.

Secured within the upper end of the coil-spring 9 is a nut 10, provided with a threaded perforation 11, and having projecting ears 12, which serve to hold the nut in place by being clamped between the convolutions of the spring, and extending downwardly through the top of the casing 2 is an adjusting-screw 13, whose exterior end is provided with a turning-knob 14, which rests upon the top side of the casing and thus supports the screw, while the lower end of the screw passes through the nut 10 and enters the coil-spring 9. Thus by turning the screw 13 by means of the knob 14 the spring 9 may be raised and lowered with the casing, and the index 15, whose arm 16 is secured to the arm 6, may be accordingly raised and lowered throughout the height of the dial 1. Thus when a vessel is placed upon the scale-pan 4, depressing the index away from the zero-mark, the index may be brought back to such mark by raising the spring through the intermediary of the screw and the goods poured into the receptacle until the index descends to the desired weight, and thereby indicates not only the weight, but the amount of money, notwithstanding the weight of the receptacle, which would otherwise have to be substracted from the gross weight, its own weight calculated in money and that amount also subtracted from the gross amount.

It frequently occurs that the tightness of the screw in the nut 10, caused by corrosion or defect in the threads, results in the nut being rotated with the screw, thereby altering the position of the nut with reference to the length of the spring, and as a consequence varying the tension of the spring. In order to guard against this, the ears 12 are slightly upturned or otherwise have formed in each of them a seat or depression 12ª, in which the convolutions of the spring accurately fit and which so grip or bind upon the convolutions as to prevent the described rotation of the nut. It will also be seen that in order that the axis of the nut may be parallel with the axis of the screw, and thus further guard against the binding of the nut on the screw, one of the ears 12 is arranged at a different elevation from the other, as more clearly indicated in Fig. 1, so that one ear may be placed between the first two convolutions, for instance, while the other is placed between the second and third convolutions without tilting the nut into an inclined position.

The combined length of the screw 13 and spring 9 is such that the screw may be turned until the mechanism supported thereby touches the bottom of the casing 2, as indicated in dotted lines, without leaving the nut 10, and hence preventing the internal mechanism from dropping off of the screw during any possible range of adjustment of the index.

By thus arranging the adjusting-screw 13 in the described relation to the spring 9 and nut 10 it will be seen that I am enabled to use a screw of maximum length without having any unsightly projection above the top of the casing 2 and without danger of projecting such screw to such an elevation as to interfere with the rising and falling movement of the scale-pan 4.

Having thus described my invention, what I claim as new, and desire to secure by Letters Patent, is—

A weighing-scale having in combination a casing, a stem projecting from said casing for supporting the article to be weighed, a coil-spring arranged within said casing and attached to said stem, a screw passing through said casing and held against downward movement thereon, a nut secured to said spring and receiving said screw, the combined length of said screw and spring being such that the mechanism supported by said spring will touch the bottom of the casing before the screw leaves the nut, and an index operatively connected with said stem, substantially as set forth.

WM. N. PELOUZE.

Witnesses:
F. A. HOPKINS,
EDNA B. JOHNSON.